United States Patent
Tu et al.

(10) Patent No.: US 10,447,481 B2
(45) Date of Patent: Oct. 15, 2019

(54) SYSTEMS AND METHODS FOR AUTHENTICATING CALLER IDENTITY AND CALL REQUEST HEADER INFORMATION FOR OUTBOUND TELEPHONY COMMUNICATIONS

(71) Applicant: ARIZONA BOARD OF REGENTS ON BEHALF OF ARIZONA STATE UNIVERSITY, Tempe, AZ (US)

(72) Inventors: Huahong Tu, Tempe, AZ (US); Adam Doupe, Tempe, AZ (US); Gail-Joon Ahn, Phoenix, AZ (US); Ziming Zhao, Chandler, AZ (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 381 days.

(21) Appl. No.: 15/459,597

(22) Filed: Mar. 15, 2017

(65) Prior Publication Data
US 2017/0264443 A1   Sep. 14, 2017

Related U.S. Application Data

(60) Provisional application No. 62/308,105, filed on Mar. 14, 2016.

(51) Int. Cl.
*H04L 9/32* (2006.01)
*H04M 3/42* (2006.01)

(52) U.S. Cl.
CPC .......... *H04L 9/3247* (2013.01); *H04L 9/3263* (2013.01); *H04L 9/3268* (2013.01); *H04M 3/42042* (2013.01); *H04M 2203/6045* (2013.01)

(58) Field of Classification Search
None
See application file for complete search history.

(56) References Cited

U.S. PATENT DOCUMENTS

| | | | |
|---|---|---|---|
| 2010/0217975 A1* | 8/2010 | Grajek | G06F 21/445 713/157 |
| 2013/0036308 A1* | 2/2013 | Buch | H04L 29/06027 713/171 |
| 2015/0281231 A1* | 10/2015 | Ganesan | H04L 63/0861 455/411 |

OTHER PUBLICATIONS

Romano, 3 Billion Phone Calls Made in US Every Day, http://www.texasinsider.org/3-billion-phone-calls-made-in-us-every-day, Jun. 18, 2013.
Lieber, Watchdog: Here's how to put a spam filter on your phone, Dallas News, https://www.dallasnews.com/news/watchdog/2014/10/11/watchdog-heres-how-to-put-a-spam-filter-on-your-phone, Oct. 11, 2014.
Federal Trade Commission, Consumer Sentinel Network Data Book for Jan.-Dec. 2014, Feb. 2015.
TrueCaller Blog, Americans Lost $8.6 Billion in Phone Scams: Learn to Protect Yourself, https://blog.truecaller.com/2014/09/02/americans-lost-86-billion-in-phone-scams-learn-to-protect-yourself/ 2014, Sep. 2, 2014.

(Continued)

*Primary Examiner* — William J. Goodchild
(74) *Attorney, Agent, or Firm* — Polsinelli PC

(57) ABSTRACT

Various embodiments of a system and method for authenticating a call request header including identity information that is lightweight and deployable in VoIP and PSTN systems are disclosed.

20 Claims, 8 Drawing Sheets

(56) References Cited

OTHER PUBLICATIONS

Brignall, "Number spoofing" scam can make you think your bank is calling, The Guardian, https://www.theguardian.com/money/2014/oct/29/number-spoofing-scam-bank-calling, Oct. 29, 2014.
Lawrence, An Identify Thief Explains the Art of Emptying Your Bank Account, Bloomberg Businessweek, https://www.bloomberg.com/news/articles/2015-07-15/an-identity-thief-explains-the-art-of-emptying-your-bank-account, Jul. 15, 2015.
Marketwired, "From Stalkers to Spam, WhitePages Study Breaks Down Reasons Americans Block Calls," http://www.marketwired.com/press-release/from-stalkers-to-spam-whitepages-study-breaks-down-reasons-americans-block-calls-1900134.htm, Apr. 16, 2014.
Cisco, ISDN Processing Overview, Chapter 3, Cisco VCO/4K ISDN Supplement, Part No. OL-5466-01 Rev. A0, Jan. 2004.
European Telecommunications Standards Institute, Global System for Mobile Communications, GSM Technical Specification 04.63 Version 5.0.0, May 1996.
Illuminet, Signaling System 7 (SS7), The International Engineering Consortium, 1999.
International Telecommunication Union, Specifications of Signalling System No. 7, ITU-T Recommendation Q.700, ITU, Mar. 1993.
International Telecommunication Union, Bearer Independent Call Control Protocol (Capability Set 2) and Signalling System No. 7, ISDN user part: General functions of messages and parameters, ITU-T Recommendation Q.1902.2, ITU-T, Jul. 2001.
3GPP, 3rd Generation Partnership Project; Technical Specification Group Core Network; Bearer Independent CS Core Network; Stage 2 (Release 4), 3GPP TS 23.205 V4.0.0 (Mar. 2001), 3GPP Organizational Partners (ARIB, CWTS, ETSI, TI, TTA, TTC), pp. 1-177, 2001.
3GPP, 3rd Generation Partnership Project; Technical Specification Group Core Network; Bearer Independent CS Core Network; Stage 2 (Release 4), 3GPP TS 23.205 V4.1.0 (Jun. 2001), 3GPP Organizational Partners (ARIB, CWTS, ETSI, TI, TTA, TTC), pp. 1-171, 2001.
3GPP, 3rd Generation Partnership Project; Technical Specification Group Core Network; Bearer Independent CS Core Network; Stage 2 (Release 4), 3GPP TS 23.205 V4.2.0 (Sep. 2001), 3GPP Organizational Partners (ARIB, CWTS, ETSI, TI, TTA, TTC), pp. 1-180, 2001.
Turner, et al., Elliptic Curve Cryptography Subject Public Key Information, Network Working Group, Mar. 2009.
Chow, et al., Authenticating Displayed Names in Telephony, Bell Labs Technical Journal, Alcatel-Lucent, vol. 14, No. 1, pp. 267-282, 2009.
Baumann, et al., Voice Over IP—Security and SPIT: Swiss Army, FU Br 41, KryptDet Report, pp. 1-34, Aug. 24-Sep. 8, 2006.
Mustafa, et al., You Can Call But You Can't Hide: Detecting Caller ID Spoofing Attacks, 2014 44th Annual IEEE/IFIP International Conference on Dependable Systems and Networks, IEEE, pp. 168-179, 2014.
Song, et al., iVisher: Real-Time Detection of Caller ID Spoofing, ETRI Journal, vol. 36, No. 5, pp. 865-875, Oct. 2014.
Croft, et al., A Model for Spam Prevention in IP Telephone Networks Using Anonymous Verifying Authorities, Information and Computer Security Architectures Research Group, Department of Computer Science, University of Pretoria, South Africa, Proceedings of the Annual Information Security South Africa Conference, Apr. 2005.
Tschofenig, et al., Using SAML to Protect the Session Initiation Protocol (SIP), IEEE Network, vol. 20, No. 5, pp. 14-17, Sep./Oct. 2006.
Saklikar, et al., Identity Federation for VoIP-based Services, Proceedings of the 2007 ACM Workshop on Digital Identify Management, ACM, pp. 62-71, Nov. 2, 2007.
Ono, et al., Have I Met You Before?: Using Cross-Media Relations to Reduce SPIT, Proceedings of the 3rd International Conference on Principles, Systems and Applications of IP Telecommunications, ACM, Jul. 7-8, 2009.
Quittek, et al., On Spam Over Internet Telephone (SPIT) Prevention, IEEE Communications Magazine, vol. 46, No. 8, pp. 80-86, Aug. 2008.
Niccolini, SPIT Prevention: State of the Art and Research Challenges, Proceedings of the 3rd Workshop on Securing Voice Over IP, 2006.
Slawson, Caller ID Basics, 10 pages, 2001.
Garg, IS-95 CDMA and cdma2000 Cellular/PCS Systems Implementation, 2000.

* cited by examiner

| Description | Decimal | ASCII | Hex |
|---|---|---|---|
| Message Type (MOMF) | 128 | | 80 |
| Message Length | 213 | | D5 |
| Parameter Code (From) | 2 | | 02 |
| Parameter Length | 10 | | 0A |
| From (6062241359) | 54 | 6 | 36 |
| | 48 | 0 | 30 |
| | 54 | 6 | 36 |
| | 50 | 2 | 32 |
| | 50 | 2 | 32 |
| | 52 | 4 | 34 |
| | 49 | 1 | 31 |
| | 51 | 3 | 33 |
| | 53 | 5 | 35 |
| | 57 | 9 | 39 |
| Parameter Code (Name) | 7 | | 07 |
| Parameter Length | 9 | | 09 |
| Name (Joe Smith) | 74 | J | 4A |
| | 111 | o | 6F |
| | 101 | e | 65 |
| | 32 | | 20 |
| | 83 | S | 53 |
| | 109 | m | 6D |
| | 105 | i | 69 |
| | 116 | t | 74 |
| | 104 | h | 68 |
| Parameter Code (Public Key) | 13 | | 0D |
| Message Length | 32 | | 20 |
| Caller Public Key | ... | | ... |
| | ... | | ... |
| Parameter Code (CIC Expiry) | 14 | | 0E |
| Message Length | 4 | | 04 |
| Epoch Time (2016-04-02 17:09:43) | 86 | | 56 |
| | 255 | | FF |
| | 252 | | FC |
| | 215 | | D7 |
| Parameter Code (CIC Signature) | 31 | | 1F |
| Parameter Length | 64 | | 40 |
| CIC Signature | ... | | ... |
| | ... | | ... |
| Parameter Code (UTC Timestamp) | 15 | | 0F |
| Parameter Length | 4 | | 04 |
| Time (06 Sep 2015 20:39:56 GMT) | 85 | | 55 |
| | 239 | | EF |
| | 71 | | 47 |
| | 156 | | 9C |
| Parameter Code (To) | 16 | | 10 |
| Parameter Length | 10 | | 0A |
| To (8084827229) | ... | | ... |
| | ... | | ... |
| Parameter Code (CST Signature) | 63 | | 3F |
| Parameter Length | 64 | | 40 |
| CST Signature | ... | | ... |
| | ... | | ... |
| Checksum | 157 | | 9D |

FIG. 8

SYSTEMS AND METHODS FOR AUTHENTICATING CALLER IDENTITY AND CALL REQUEST HEADER INFORMATION FOR OUTBOUND TELEPHONY COMMUNICATIONS

CROSS REFERENCE TO RELATED APPLICATIONS

This is a non-provisional application that claims benefit to U.S. provisional application Ser. No. 62/308,105, filed on Mar. 14, 2016, which is herein incorporated by reference in its entirety.

FIELD

The present disclosure generally relates to a system and method for authenticating a call request header, and in particular to authenticating a call request header including identity information that is lightweight and deployable in PSTN and VoIP systems.

BACKGROUND

Since its introduction in 1876, telephony communication is an integral part of modern society which allows us to communicate by voice with colleagues and family members across the country or across the world. With mobile devices, we take the ability for voice and messaging communication everywhere.

Unfortunately, one of the most frustrating aspects of modern telephony communication is spam, namely robocalls, voicemail spam and SMS spam. Despite US laws that prohibit caller ID spoofing and telephone spamming (with some exceptions), complaints on illegal calls makes record numbers year after year. The total number of complaints on illegal calls in the United States totaled more than 22 million in 2014, with about 200,000 complaints each month about robocalls alone.

While spam itself is frustrating and wastes the user's time, there is a malicious side to spam: malicious actors disseminate telephone spam with caller ID spoofing to perpetuate scams. According to a survey conducted by TrueCaller in 2014, approximately 17.6 million Americans were victims of a phone scam and lost an average of $488 per person, costing approximately $8.6 billion annually.

The rise of telephony spam is troubling, particularly when it seems that both research and community have made great strides in combating email spam. A previous survey of the telephone spam ecosystem revealed that one key difference between email and telephone communication is that the caller ID mechanism in telephone communication is not trusted and can be easily spoofed. Email has a sender IP address, and many email spam solutions take advantage of this IP address, however, the caller ID of telephone communication is trivially spoofed (in fact, there are many online services that allow one to place voice calls while changing the caller ID). Therefore, caller ID spoofing perpetuates and enables spam and scams.

In the current public switched telephone network (PSTN) caller ID scheme, the caller ID is easily spoofed, due to lack of an authentication mechanism. When the phone is ringing, it is also impossible for the user to know if the caller ID has been spoofed. The only possible way for the recipient to determine if the caller ID is legitimate is to call the caller ID number. Of course, this solution is not feasible, because it adds inconvenience, increases time delay, does not work with shared or extension lines, and adds significant cost burden on the call recipient (especially for premium or international numbers).

BRIEF DESCRIPTION OF THE DRAWINGS

FIG. 8 is a simplified illustration showing a MDMF message extended to incorporate the Communication Session Token and Caller ID Certificate.

Corresponding reference characters indicate corresponding elements among the view of the drawings. The headings used in the figures do not limit the scope of the claims.

DETAILED DESCRIPTION

The security indicator (green lock) in modern web browsers lets the user know that the identity of the web site is verified. One goal of the present invention is to add a similar security indicator to caller ID, so that the user knows that the caller ID is verified. However, the authentication mechanism is added to the three-decades-old caller ID scheme. The present invention relates to an authentication scheme, called the HAMOUT system, which aims to fundamentally solve the caller ID spoofing problem. The HAMOUT system enables the real caller to securely transmit the caller ID information (possibly including name and photo) to the recipient and allows the recipient to quickly verify the caller ID information, before or during the ring. In some embodiments, the HAMOUT process is extensible to allow the caller ID to be authenticated for messages, such SMS and MMS, and the HAMOUT data scheme is extensible to allow the real caller to securely embed additional information about the call.

Another goal of the HAMOUT system is to provide a trusted platform for caller ID, to combat spam in the telephony networks. This system would be useful in many real-world scenarios, such as authenticating calls from billing, government, or banking institutions. There are many scam calls that spoof the caller ID to make it appear as if the call is from a billing or banking institution, and then trick the recipients into giving out their sensitive credit card or banking information. The HAMOUT system would also be useful in authenticating calls from real customers, as there are scam calls that spoof the caller ID to make it appear as if the call is from a customer, and then trick the institution into emptying their customers' bank account. In addition, by securing the caller ID, existing spam defenses can leverage the caller ID information and the malicious actor cannot spoof the caller ID. This will increase the effectiveness of telephone spam defenses.

To understand the HAMOUT system, it must first understand how the legacy caller ID implementation works, how legacy caller ID can be easily spoofed, and how spammers can leverage the spoofed caller ID to send spam.

Call Setup Sequence Overview

Figure 1:
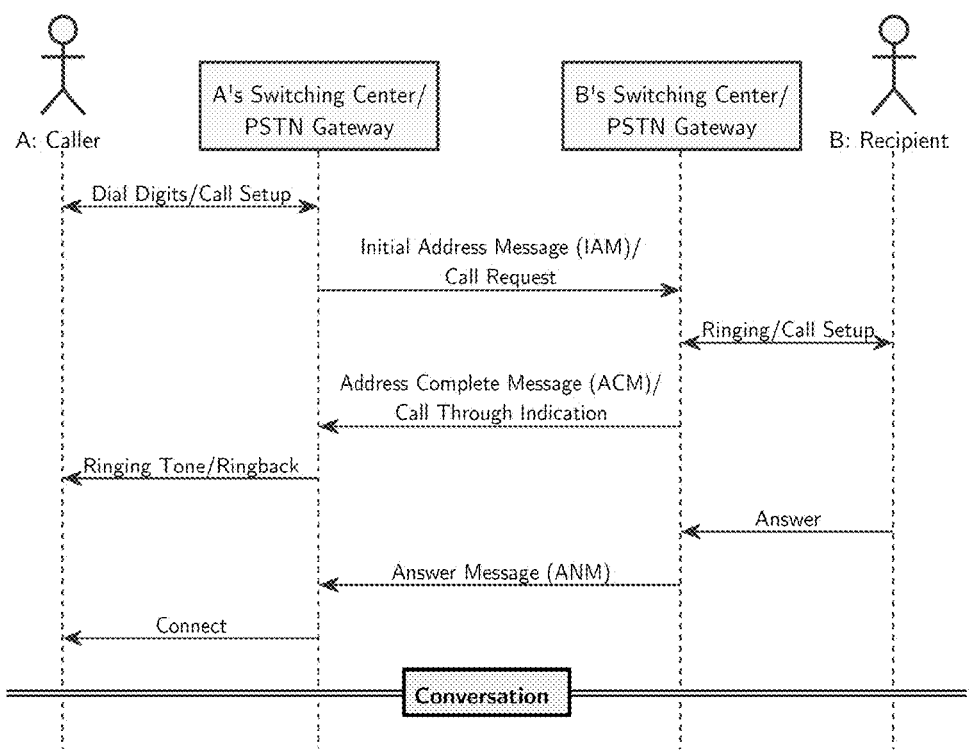
FIG. 1 is a simplified illustration showing a typical call setup sequence in a PSTN system.

FIG. 1 shows a typical call setup sequence in the PSTN system. The Public Switched Telephone Network (PSTN) is an aggregate of various interconnected telephone networks that adheres to the core standards created by the International Telecommunication Union (ITU), allowing most telephones to intercommunicate. The traditional PSTN infrastructure was specifically designed to carry continuous, real-time, voice communications for call durations of three minutes or less. The network is engineered to be circuit-switched and it establishes a dedicated connection across intermediate switches between the caller and recipient for the entire duration of the call. Today, the core network has evolved to be almost entirely packet-switched, carried by IP networks, due to the vastly greater network capacity of the TCP/IP infrastructure. However, the core telephony signaling protocols have not changed, to ensure mutual compatibility.

The Signaling System No. 7 (SS7) suite of protocols defines a full vertical set of network standards for the Integrated Services Digital Network (ISDN). Initially developed by the International Telecommunication Union in the 1980s, SS7 serves to ensure interoperability between telephone exchanges worldwide. In fact, telephone companies rarely expose SS7 network to end users, instead they provide access to a signaling and media gateway via a protocol specific to the local exchange (e.g., POTS, GSM, CDMA, UTMS, ISDN, SIP, etc.). Any call initiated from a local exchange network usually enters at least one layer of signaling and media conversion at a PSTN gateway before entering or exiting the SS7 network. This is one of the key differences compared to the TCP/IP infrastructure, where TCP/IP signals (packets) are designed to be transparently carried end-to-end with no intermediary protocol conversions.

There are currently more than 8 different standards used to establish a call, with each standard defining its own call setup sequence: GSM, CDMA, 3G UTMS, SIP, H.323, IMS, VoLTE, V5.2, and ISUP. Every standard except for ISUP is typically used within a local exchange network. ISUP is part of the SS7 protocol suite, and is used primarily for backbone switches and private branch exchanges (PBX). Each call setup process is extremely complicated, hence we will not explain the details of each. We will instead present a simplified overview of how a call setup process works shown in FIG. 1.

In general, the sequences within a local exchange network (user ⇌ switching center in FIG. 1) define how a user's terminal interacts with the local exchange carrier during a call setup, and the sequences within an interexchange network (switching center ⇌ switching center in FIG. 1) define how two carriers interact with each other during a call setup.

Calling Number Identification

Caller ID is the generic name for a supplementary service offered by the recipient's telephone company that provides information about the incoming caller's telephone number to the recipient's terminal typically before or during the ring. Caller ID service provides the caller's telephone number, technically known as Calling Party Number (CPN), to the recipient before or during the ring of an incoming call. It also allows the recipient to decide whether to answer a call based on the caller ID and to call back if the call could not be answered. Caller ID is also widely used in other non-voice communication services, such as SMS, MMS, and many smartphone-based instant messaging and VoIP services. The caller ID number is typically provided by the caller's switch, sent along the initial address message (IAM) across the SS7 network, and, after a series of protocol conversions at the recipient's gateway, is finally presented on the recipient's terminal. The caller's switch can control what caller ID number is sent on a call-by-call basis. For general consumers, a privacy feature allows them to hide the calling number. However, malicious callers often spoof or block caller ID to further a variety of scams.

In the backbone SS7 network, the transmission of the caller ID number to the destination switch can be achieved either by having the originating switch include it in the Initial Address Message (IAM) or by the destination switch requesting it from the originating switch through an ISDN-UP information request message. Even though each call setup process is different, depending on the type, the caller ID is essentially a field delivered to the recipient's terminal within a call request header message, before or along with the call setup (ring) signal.

Figure 2:
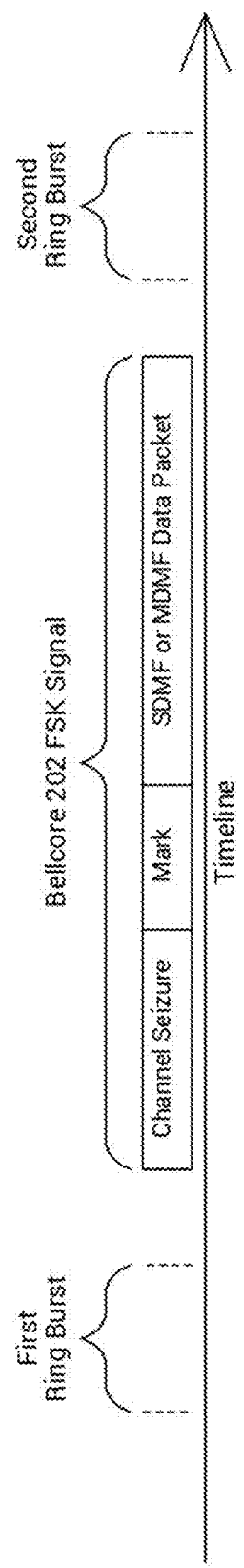
FIG. 2 is a simplified illustration showing a POTS SDMF/MDMF transmission.

In landline telephone services, the most popular type being the Plain Old Telephone Service (POTS), the caller ID is a parameter within the header message encoded in Bellcore Single Data Message Format (SDMF) or Multiple Data Message Format (MDMF), transmitted to the recipient's terminal in Frequency Shift Keying (FSK) signal between the first and second ring as shown in FIG. 2.

In mobile telephone services, the most popular of which are the GSM (Global System for Mobile Communications) and CDMA (Code division multiple access) technology, the caller ID is a parameter within the SETUP message which is transmitted using an encrypted signal over-the-air to the recipient's terminal.

Caller ID Spoofing

Caller ID spoofing is the practice of deliberately falsifying the number that appears on a recipient's caller ID display. In the PSTN, the caller ID can be easily spoofed because there is no built-in authentication mechanism. The caller's switch is responsible for sending or reporting the caller ID, however, this is not authenticated or immediately verifiable by the recipient. In consumer telephony terminals, the caller ID is usually managed by the caller's Local Exchange Carrier (LEC) and transmitted by the caller's switching center, which prevents general users from spoofing the caller ID. However, this security barrier is eroded by an entity with their own Private Branch Exchange (PBX) or PSTN gateway system. The PBX is a privately owned PSTN switch that connects telephones internal to an organization to the PSTN backbone. An organization with their own PBX system can customize the caller ID sent to the recipient's switch. The caller's LEC does not have any legal or technical obligation to ensure that the caller ID number is indeed owned by the caller before it is transmitted.

Traditionally, it was prohibitively expensive for individuals and small businesses to subscribe to an ISDN-PRI trunk line (prices from $500 to greater than $1,000 per month) and install a PBX system (prices in the thousands), which kept the number of people with caller ID spoofing capability small. However, with the recent rise of high speed IP infrastructure replacing the dedicated ISDN infrastructure, cheap Voice over IP (VoIP) services (such as SIP trunking) are replacing the expensive ISDN-PRI services, and low-cost IP-based PBX devices ($100 or less) are replacing the expensive traditional PBX systems. Furthermore, with the rise of the web service business model, some telephone companies can even provide PBX-like VoIP service without requiring the clients to install an IP-based PBX device. Many Internet Telephone Service Providers sell customizable caller ID as a service feature. Some high-volume Internet Telephony Service Providers (such as CallFire and Call-Em-All) even cater specifically to telemarketers, by providing voice broadcasting autodialers, voicemail broadcasting, and SMS broadcasting bundled in their telephony services.

Spamming and Caller ID Spoofing

Caller ID spoofing can be used to assist malicious callers to further a wide variety of phishing scams. A malicious caller can spoof the caller ID to make it appear as if a call or SMS originated from a trusted entity, tricking the recipients into divulging sensitive information such as usernames, passwords, credit card details, and even money. In recent years, many consumers in the United States have been victims of social engineering attacks directly attributable to caller ID spoofing, such as credit card verification scam, IRS tax agent scam, and fake tech support scam. Some of these phishers even use audio duplicated from the real institution to trick the recipient into divulging their sensitive information.

Caller ID spoofing also helps malicious callers to defeat anti-spam defenses that rely on caller ID blacklisting. Most modern mobile phones support the capability to block unwanted calls or SMS using caller ID. According to a consumer poll, 22% of US smartphone users used a call-blocking app or a feature to block calls on their device. However, a malicious caller can easily bypass caller ID blacklisting by spoofing any number not blacklisted.

Furthermore, Caller ID spoofing makes it extremely difficult for law enforcement to track down the malicious caller. The telephone number follows a numbering format that identifies the Region code, Central Office code, and Subscriber number. If the telephone number is spoofed, law enforcement would lose key information that could identify the offender. Further complicating matters, with the increasing availability of VoIP-to-PSTN services, a spammer may distribute outbound calls from an overseas location, through an Internet connection to the VoIP carrier, which could be further anonymized behind VPN or Tor networks.

Design Goals

The HAMOUT system is a lightweight and practical caller ID authentication and verification scheme. The high-level idea is to embed Authenticated Caller IDs in the PSTN call process itself that is still able to interoperate on different PSTN standards.

Even though caller ID verification itself faces several technical and societal challenges, we identify the following fundamental causes: (1) the lack of authentication during the declaration of the caller ID and (2) the lack of verification of the transmitted caller ID. Fixing these two problems directly addresses the aspect of trust establishment which helps users verify that they are actually communicating with the legitimate parties they intend. The fundamental security flaw of caller ID is that the caller ID number can be declared arbitrarily. Furthermore, there are currently no mechanisms to prevent the caller ID data from modification during transmission. Even if the caller has proven that she indeed owns that number, an actor (perhaps in association with the caller) along the transmission link may still intercept and alter the caller ID data. Hence, the proposed scheme must address the aforementioned security challenges, and it also needs to be simple and flexible enough to be compatible with the existing protocol standards.

Actors

The following actors are defined under the HAMOUT system:

Caller is a calling terminal or an origination switch for the calling party that generates and transmits a call request header to the recipient before or during the ring. Recipient is a receiving terminal or a termination switch for the called party that can receive and process a call request header before or during the ring.

Recipient is a receiving terminal or a termination switch for the called party that can receive and process a call request header before or during the ring.

Registrar is the entity that manages registration and verification of phone number information and issues Caller Identity Certificates (CIC) to verified assignees of phone number.

Header Fields

The HAMOUT system defines a set of fields in the call request header that authenticate the caller ID and the information about the call.

The fields are designed to be added as an extension to any existing format of call request header in PSTN, and it can also be added to any other communication format, such as SMS and MMS, as long as the header data is transmitted before or during a communication request.

There are a total of seven required fields that works together to authenticate the caller ID, which we group into two categories: Caller Identity Certificate and Call Session Token.

Caller Identity Certificate (CIC)

The Caller Identity Certificate (CIC) is a set of fields that provide the calling identity information of a caller. It is designed such that the information about the caller cannot be arbitrarily declared and must be verified by undergoing a verification process with the Registrar. A CIC consists of identity fields, and CIC signature fields.

1) Identity Fields are fields that provide information about the identity of the caller. All identity fields must be verified by the Registrar. Identity Fields can also be extended to include other verifiable information about the caller other than the ones listed below.

From provides the routing address of the caller (i.e. the caller's phone number in the PSTN). The From field is presented to the recipient to identify the caller's caller ID before or during the ring. In most existing protocols, this field is the same as the caller ID field in the call request, hence it may not need to be included again explicitly.

Public Key of the caller allows the recipient to verify any data signed using the caller's private key. The public key also allows the recipient to send encrypted data to the caller, which could only be decrypted with the caller's private key, and therefore could be used to exchange a symmetric key to establish an encrypted conversation.

2) CIC Signature Fields demonstrate the authenticity of the enclosed fields in the CIC with a digital signature of the Registrar. It must specify a signature's expiration time and the digital signature. All CIC signature fields must be generated by the Registrar.

CIC Expiry provides the Coordinated Universal Time (UTC), after which the CIC Signature is no longer valid.

CIC Signature provides the digital signature generated by signing all the enclosed fields in the CIC. The CIC signature can be verified by anyone using the Registrar's public key certificate.

Communication Session Token (CST)

A Communication Session Token (CST) consists of a set of fields that uniquely identify a call request sent by an authenticated caller. The CST is designed to have the property of being transient and unique. The Communication Session Token can also provide additional information about the call, declared by the authenticated caller. A CST consist of session fields and a signature.

1) Session Fields: are fields that provides information about the call session. All session fields must be generated by the caller. Session Fields can also be extended to include other information about the call session other than the ones listed below.

Timestamp provides the UTC timestamp of the call request. This allows the recipient to verify the time in which the call was initiated.

To provides the routing address of the recipient. This allows the recipient to verify that the call requested is uniquely created for the recipient. In most existing protocols, this field is implied from the receiving the call request, hence it may not need to be included explicitly.

2) CST Signature demonstrate the authenticity of the enclosed fields in the CST. The signature is generated by signing the data using the caller's private key of the CIC. The recipient can verify the CST signature using the caller's public key provided in the CIC.

Processes

Figure 3:
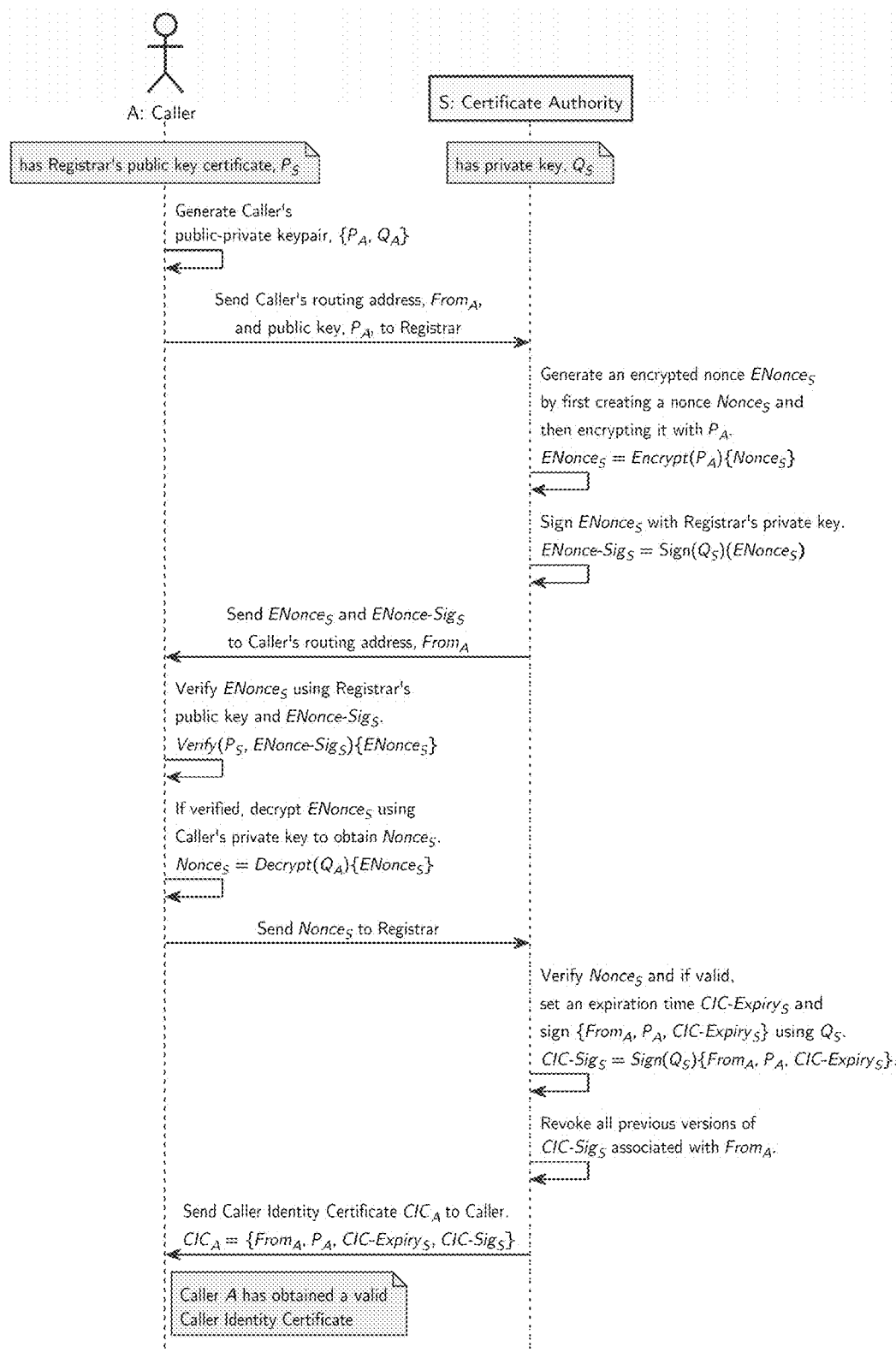
FIG. 3 is a sequence diagram showing the basic steps to obtain a valid Caller ID Certificate.

1) Caller ID Registration: To obtain a Calling ID Certificate, Hamout requires all callers to undergo a registration and verification process with the Registrar. Without a valid Calling ID Certificate, the caller will not be able initiate a call with an authenticated caller ID. During the registration process, the Registrar verifies the caller's telephone number and public key. This process is to ensure true ownership of a claimed phone number. The Caller ID Registration process is designed such that only the true owner of a claimed phone number can successfully complete this process. Each Calling ID Certificate is unique and each phone number can only associate with at most one Calling ID Certificate at any given time. A key difference between Hamout and the SSL/TLS Public Key Infrastructure is that Hamout can automatically verify ownership of the caller ID. In addition, the entire process can be automated or pre-initialized without any interaction from the user. A sequence diagram of the Caller ID Registration process is shown in FIG. 3.

Prerequisites to the process: (1) the Caller has the Registrar's public key certificate and (2) the Registrar has the corresponding private key.

Steps of the process:
1) Caller first generates a public-private key pair, and the private key is stored securely (such as in a password protected keystore or secure hardware-backed storage) to prevent unauthorized access.
2) Caller sends Caller's routing address $From_A$ and public key $P_A$ to the Registrar. Caller could also send other verifiable Caller's identity information, such as an access token to Caller's social networking service account, to verify Caller's name and photo.
3) Registrar creates an encrypted nonce $ENonce_S$ by first generating a random nonce $Nonce_S$ and then encrypting it with the Caller's public key. $ENonce_S = Encrypt(P_A)\{Nonce_S\}$. This ensures that only someone with the Caller's private key can decrypt $ENonce_S$. The $Nonce_S$ is stored in a self-expiring time-to-live database for verification in a later step.
4) Registrar signs the $ENonce_S$ to create a signature $ENonce\text{-}Sig_S$. This is to safeguard the nonce from being modified during transmission.
5) Registrar sends $ENonce_S$ and $ENonce\text{-}Sig_S$ to Caller's routing address $From_A$. This is the key step in the process, as in the PSTN, the routing address is the telephone number. Thus, the Caller would receive $ENonce_S$ and $ENonce\text{-}Sig_S$ only if $From_A$ routes to Caller.
6) Caller verifies the $ENonce_S$ using its signature. If $ENonce\text{-}Sig_S$ is verified, (the $ENonce_S$ is really from the Registrar), the Caller decrypts $ENonce_S$ with Caller's private key to obtain $Nonce_S$.
7) Caller sends $Nonce_S$ to Registrar (proving that the Caller is really the owner of the routing address and public key).
8) Registrar verifies $Nonce_S$ and, if valid, sets a CIC expiration time $C/C\text{-}Expiry_A$ and generates a CIC Signature $CIC\text{-}Sig_S$. The $CIC\text{-}Sig_S$ is generated by signing $From_A$ and $P_A$, and other validated identity information, and $Expiry_A$ using the Registrar's private key. The CIC expiration time keeps the revocation list small and prevents someone from claiming a contract address indefinitely.
9) Registrar revokes all previous (if any) CIC Signatures associated with $From_A$. This is to ensure that only the latest owner of the routing address could use the valid CIC of $From_A$, hence this prevents more than one person from using the same routing address.
10) Registrar sends Caller's Caller Identity Certificate (CIC) to Caller. The CIC consists of Caller's routing address, the public key, other identity information, the CIC expiration time, and the CIC Signature.

After the last step, the Caller can now use the Caller Identity Certificate to generate authenticated call request headers—without contacting the Registrar to obtain a new CIC.

Security and Usability Features

Authentication: The caller will receive a valid Caller ID Certificate only if it is able to prove being the assignee of the phone number. It is not possible for an attacker in our threat model to receive a valid Caller ID Certificate using a spoofed phone number.

Integrity: The caller will not accept a message from the Registrar that has been modified in transit because every message sent by the Registrar will be signed and verifiable with the Registrar's public key certificate.

Low User Effort: Minimal user effort is required to initiate a new Caller ID Registration request, as the entire process can be automated or pre-initiatized by the caller's terminal.

Easy Key Revocation: Even when a caller is compromised from theft of a private key, it is easy to revoke and obtain a new caller ID certificate simply by initiating a new Caller ID Registration request.

Easy Identity Recovery: When a caller loses the private key, it is easy to revoke and obtain a new caller ID certificate simply by initiating a new Caller ID Registration request.

Low Key Maintenance: There is no requirement for the caller or Registrar to maintain old keys, as each phone number is only associated with at most one key at any given time. This also prevents multiple persons from simultaneously claiming a single phone number.

Figure 4:
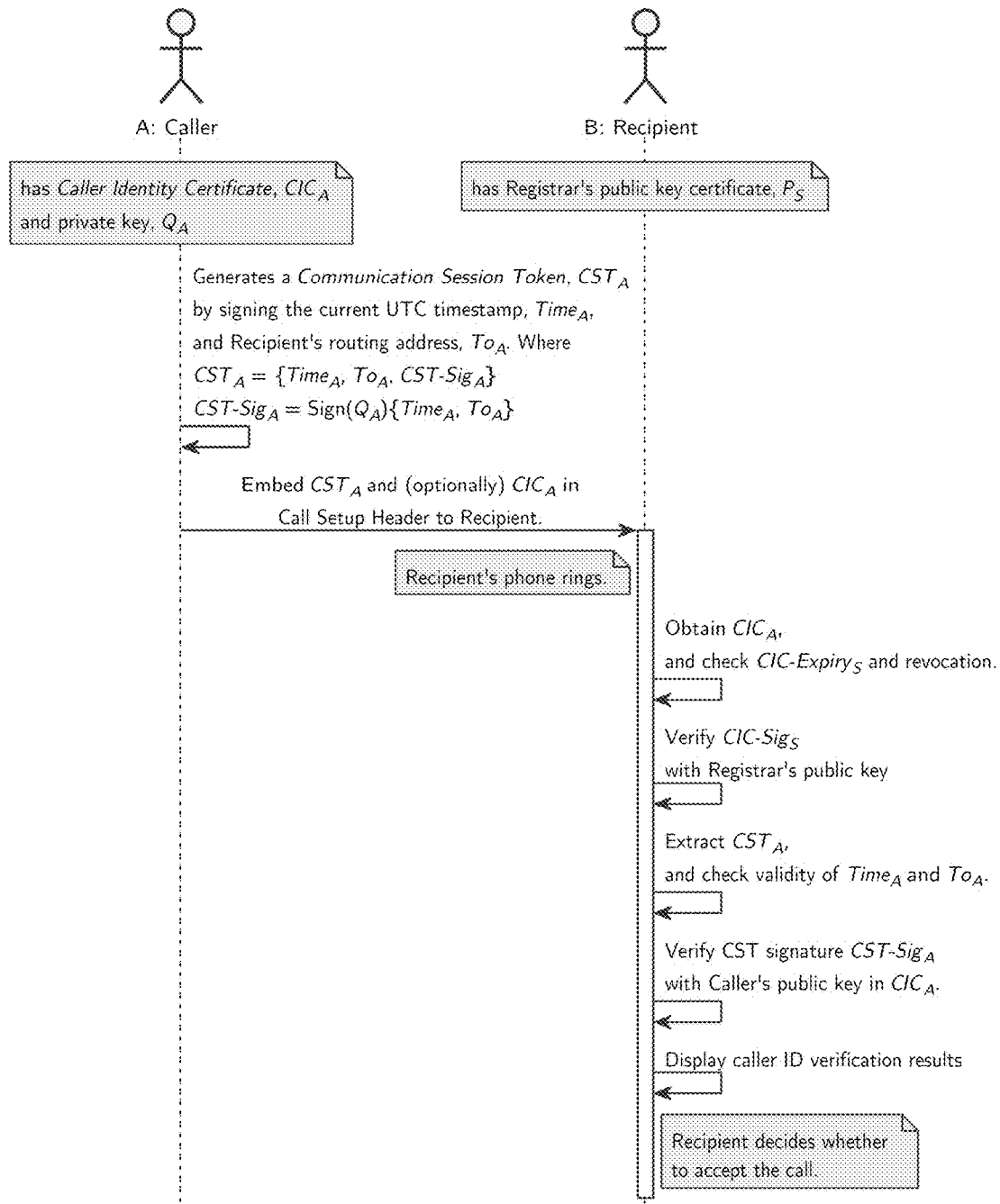
FIG. 4 is a sequence diagram showing the basic steps to make a phone call with a Caller ID Certificate.

Authenticated Call Request: To initiate an authenticated call request, the caller must first obtain a valid Caller ID Certificate (described in Section [caller-id-registration-process]). The authenticated call request process is designed such that only the authenticated caller can uniquely generate such a request and only the authenticated caller can use that request. Each call request session is unique and transient. The process only requires a one-way transmission-which can be placed in the same signal of transmitting the (currently unauthenticated) call setup header in every PSTN standard. The entire process can be automated without any interaction from the caller and the recipient. A sequence diagram of the Authenticated Call Request process is shown in FIG. 4.

Prerequisites: (1) Caller has a valid $CIC_A$ and private key $Q_A$ and (2) Recipient has Registrar's public key certificate $P_S$.

Steps of the process:
1) Caller first generates a Communication Session Token, $CST_A$ by signing the current UTC timestamp $Time_A$, Recipient's routing address $To_A$, and optionally additional call information. The inclusion of timestamp and Recipient's routing address ensures that this call request is transient and unique, and guards against the recipient from performing replay attacks. Signing the fields with the Caller's private key also proves that the Caller is the owner of $CIC_A$.
2) Caller sends $CST_A$ and (optionally) $CIC_A$ to Recipient along with the caller request header. If the size of the header is limited by the protocol, it is also possible for the Caller to send only the $CST_A$ with the plain caller ID number and let the Recipient obtain the $CIC_A$ from a public database, from the Registrar, or from a previous communication.
3) Recipient's phone rings. The terminal does not necessarily need to ring immediately, as some terminals have a short delay timer to allow more time to process the call request header.
4) Recipient obtains the $CIC_A$, checks if $C/C\text{-}Sig_S$ has expired or is revoked, and checks if the signature is valid.
5) If the CIC is valid, Recipient verifies Caller's Communication Session Token by checking if the timestamp is within a valid duration and checking if the $To_A$ signed by the CST signature is indeed the recipient's routing address. Finally, the CST signature is verified against all the enclosed fields.
6) Display the verification result with the caller ID.

After the last step, the Recipient user decides whether to answer the call (as normal) based on the authenticated caller ID.

Security and Usability Features

Authentication: The caller will be able generate an authenticated call request only if it is the verified owner of the caller ID certificate of that caller ID number. It is not possible for an attacker in our threat model to generate a valid Communication Session Token using a spoofed phone number.

Integrity: The recipient will not accept an authenticated call request that has been modified in transit because the Communication Session Token message sent by the caller is signed and verifiable with the caller's Caller ID Certificate.

Low User Effort: Minimal user effort is required to generate an authenticated caller ID, as the entire process can be automated or delegated to the caller's telephone service provider. The caller makes a call request as normal and the recipient sees an incoming call request with the caller ID as normal, with a caller ID verification indicator.

Forward Secrecy: Future compromise of the caller's private key does not result in compromise or untrustworthyness of previously generated authenticated call requests.

Low Latency: Very little processing power and latency is needed to generate or verify an authenticated caller ID, as some signature algorithms such as ECDSA has been proven to require extremely low processing time even with a basic 80 MHz 32-bit ARM7TDMI microprocessor.

Low Storage Requirement: The caller and recipient do not need to store each Communication Session Token. The caller's terminal needs to store only the private key and the caller ID certificate. The recipient's terminal needs to store only the Registrar's public key certificate and perhaps a small cache of caller ID certificates from past callers.

Low Bandwidth Requirement: The transmission of authenticated caller ID requires very little bandwidth usage, as we show in Section [sec:evaluation] that the data size of each authenticated caller ID data can be as low as 71 bytes, allowing it to fit within all types of existing call setup headers.

Deploying Hamout in Existing PSTNs

In this section it is discussed how Hamout could be rolled out in the existing telecommunications networks. We need to consider both terminal and core networks, since every call request usually starts from the caller's terminal network, then gets converted through the SS7 core network, and then gets convert through again to reach the recipient's terminal network. Because there are too many types of termination networks, we will focus on the most popular types of network in the PSTN ecosystem. Deployment on other networks can be borrowed from the ones that we discuss below.

Backbone and ISDN Service

Figure 5:
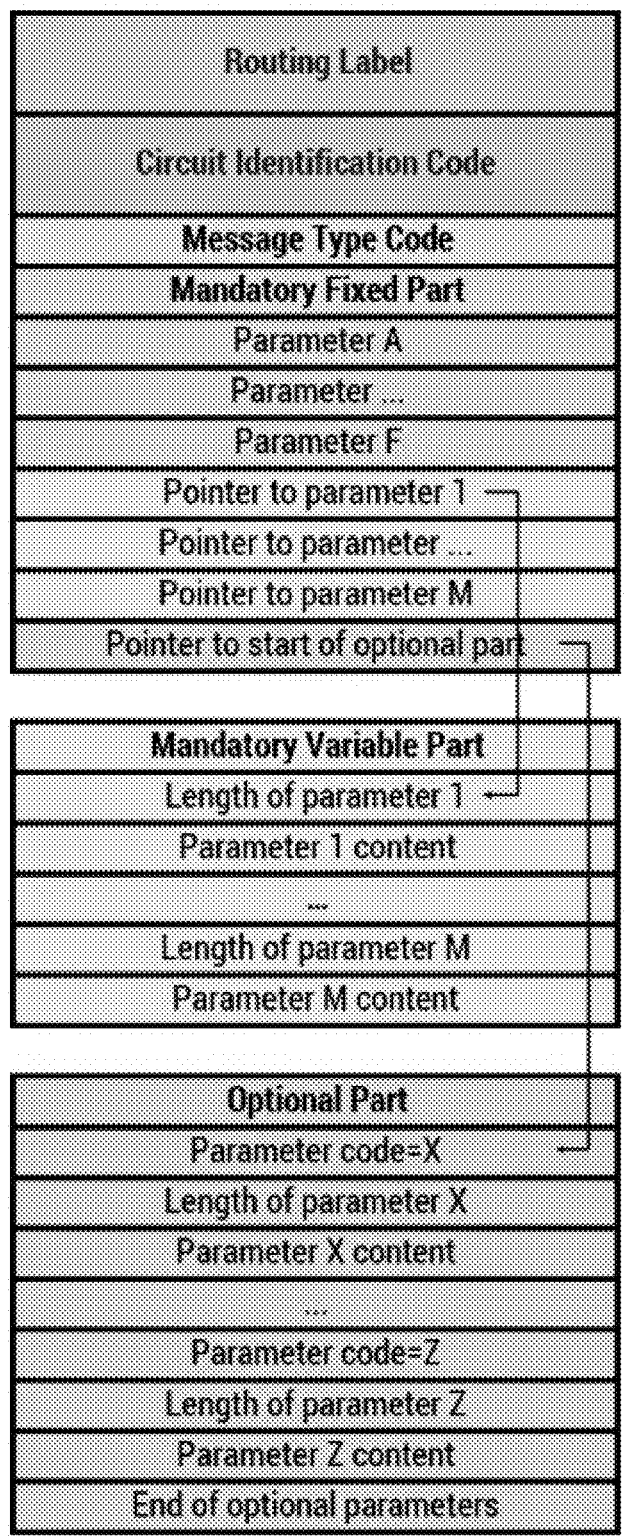
FIG. 5 is a simplified illustration showing an ISUP message structure.

In some embodiments, the Hamout system could be deployed in the PSTN backbone by extending the Initial Address Message (IAM). The switches in the SS7 network use a type of call request message known as the Initial Address Message (IAM) to initiate a call. The IAM is generated and transmitted by the caller-side switching center to reach the recipient-side switching center. The IAM is based on the ISDN User Part (ISUP) message format as shown in FIG. 5. Each ISUP message contains a Mandatory Fixed Part, Mandatory Variable Part, and Optional Part. In the Optional Part of the IAM, each parameter data is preceded with a 1-octet Parameter Code and a 1-octet Parameter Length. The IAM currently use the optional part to send the caller ID information to the recipient switch. We propose to add the new Hamout fields (caller's public key, CIC Expiry, CIC Signature, Timestamp, CST Signature, and all other optional parameters other than the caller's phone number) also in the optional part of the IAM. The interconnecting switches would simply need to forward the extended IAMs throughout the network.

Subscribers of ISDN-PRI with access to their own PBX/IP-PBX device would also have the capability to receive and transmit IAM call request headers. Since almost all PBX/IP-PBX devices today have some form of data transmission capability, therefore the subscriber would be able to directly communicate with the Registrar to obtain a caller ID certificate, and then generate and transmit the authenticated call request fields.

POTS/Landline Service

In some embodiments, the Hamout system could be deployed in POTS landlines by extending the SDMF/MDMF message. In POTS network, the header message that contains the caller ID information is transmitted in either Single Data Message Format (SDMF) or Multiple Data Message Format (MDMF). SDMF is a fixed parameter message structure consisting of the date and time and the caller's telephone number. MDMF is a message structure that can consist of a variable number of parameters and can accommodate parameters with variable length, such the field to present the caller name. Both formats can be extended to embed the Hamout fields, but we recommend using MDMF due to its better design in terms of flexibility and expendability.

Based on the MDMF parameter format, we could incorporate the Hamout fields by extending the MDMF. In the MDMF message, each parameter data is preceded with a 1-octet Parameter Type and a 1-octet Parameter Length. We propose to add new Parameter Types for caller's public key, CIC Expiry, CIC Signature, Timestamp, To, CST Signature, for those are not defined in the Bellcore 202/ITU parameter code table. FIG. 8 is a simplified illustration showing a MDMF message extended to incorporate the Communication Session Token and Caller ID Certificate.

For the caller, the current POTS terminals do not directly generate or transmit the caller request header message, it is instead handled by the caller's switching center. We expect caller's telephone service provider would also need to be delegated to handle the Hamout processes, to initialize registration of caller ID certificate and generate authenticated call request on behalf of the subscriber.

For the recipient, the authenticated caller ID fields would be received in the SDMF/MDMF message, after an IAM to SDMF/MDMF conversion at the recipient's gateway switch. After receiving the SDMF/MDMF message with authenticated call header, the signature and validity checks would be executed by the recipient's terminal. The recipient could use a standalone device to handle the signature and validity checks, similar to the existing Caller ID blocker devices for POTS landline terminals.

Alternatively, it is also possible to allow the recipient's switching center to verify the authenticated call request on behalf of the recipient, and then transmit the caller ID information in the same existing format, displaying the caller ID or a caller ID flag only if it has been verified. This approach has the benefit of not requiring any extension to the SDMF/MDMF message format. However, this approach is potentially vulnerable to "Orange box" attacks, where the malicious caller is able to alter the SDMF/MDMF content with spoofed FSK signals.

GSM/CDMA Mobile Service

In some embodiments, the Hamout system could be deploy using two separate approaches to authenticate the call request headers in GSM/CDMA mobile telephone services: Delegated or User Controlled.

Delegated:

The Hamout system could be deployed in GSM/CDMA mobile networks by having the telephone service provider handling the generation of authenticated call request on behalf of the caller. For the caller, the current mobile terminals do not directly generate or transmit the call request messages, instead it is handled by the caller's mobile switching center (MSC). It is also possible to give control over the registration of caller ID certificate to the caller, as most mobile phones today support some form of data transmission (such as SMS, MMS, or TCP/IP), the terminal can directly communicate with the Registrar to obtain the caller ID certificate. The Subscriber Identity Module (SIM) could be used as the private key, which has private key information is already shared with the telephone service provider. During the call setup phase, when the caller initiates the call request with the mobile switching center (MSC), the MSC is able to generate the authenticated call request and transmit the IAM to the recipient's switching center.

For the recipient, the authenticated caller ID verification could be executed by the recipient's mobile switching center, and then transmit the caller ID information in the same existing format, displaying the caller ID or a caller ID flag only if it has been verified. It would be reasonably secure to allow the switching center to send the caller ID information, as GSM/CDMA uses an encrypted signaling format to transmit the call request header containing the caller ID.

If the switching center or the wireless network is at risk of compromise, an alternative is to have the signature and validity checks directly executed by the recipient's terminal, after an IAM to SETUP message conversion at the recipient's gateway switch.

GSM/CDMA Mobile Telephone Service

In some embodiments, two separate approaches are used to authenticate the call request headers in GSM/CDMA mobile telephone services: Delegated or User Controlled.

1) Delegated

Figure 6:
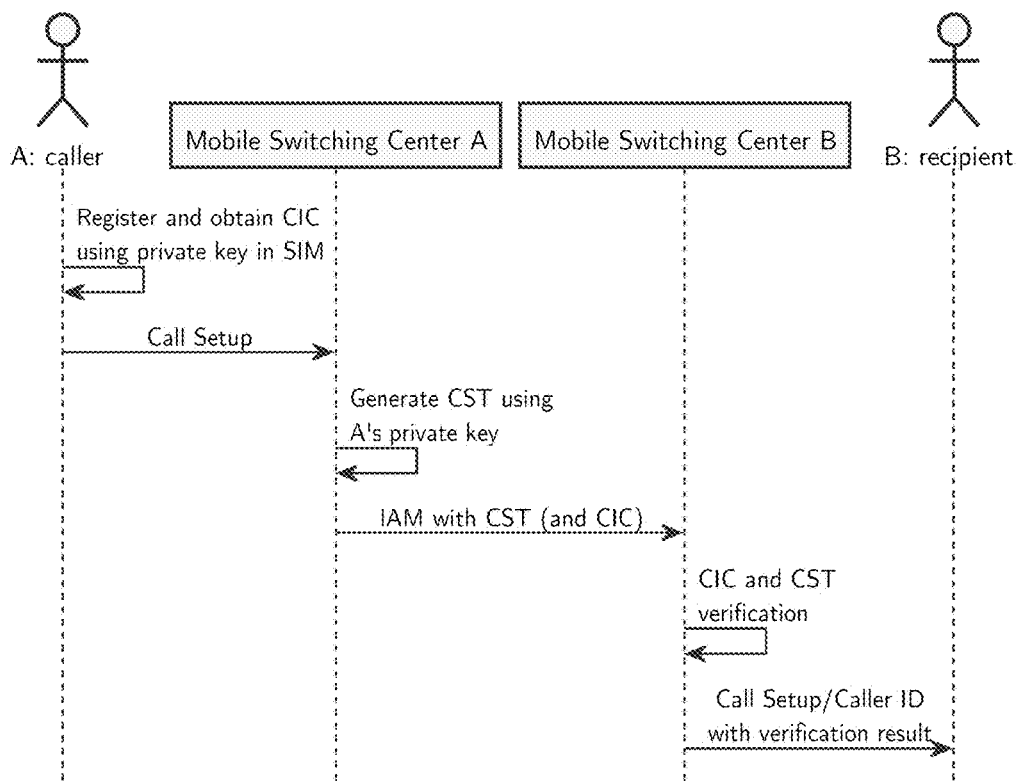
FIG. 6 is a simplified illustration showing a delegated GSM/CDMA authenticated call request.

The Hamout system could be deployed in GSM/CDMA mobile networks by having the telephone service provider handling the generation of authenticated call request on behalf of the caller. For the caller, the current mobile terminals do not directly generate or transmit the call request messages, instead it is handled by the caller's mobile switching center (MSC). It is also possible to give control over the registration of caller ID certificate to the caller, as most mobile phones today support some form of data transmission (such as SMS, MMS, or TCP/IP), the terminal can directly communicate with the Registrar to obtain the caller ID certificate. The Subscriber Identity Module (SIM) could be used as the private key, which has private key information is already shared with the telephone service provider. During the call setup phase, when the caller initiates the call request with the mobile switching center (MSC), the MSC is able to generate the authenticated call request and transmit the IAM to the recipient's switching center. FIG. 6 is a simplified illustration showing a delegated GSM/CDMA authenticated call request.

For the recipient, the authenticated caller ID verification could be executed by the recipient's mobile switching center, and then transmit the caller ID information in the same existing format, displaying the caller ID or a caller ID flag only if it has been verified. It would be reasonably secure to allow the switching center to send the caller ID information, as GSM/CDMA uses an encrypted signaling format to transmit the call request header containing the caller ID.

If the switching center or the wireless network is at risk of compromise, an alternative is to have the signature and validity checks directly executed by the recipient's terminal, after an IAM to SETUP message conversion at the recipient's gateway switch.

2) User Controlled

It is also possible to allow mobile users to fully control the entire processes of authenticated caller ID. This requires the use of an end-to-end data transmission channel, such as SMS, MMS or TCP/IP.

The caller simply needs to use a data transmission channel to directly contact the Registrar to obtain a valid caller ID certificate.

For the caller, after obtaining the caller ID certificate, the mobile terminal would then generate and transmit the authenticate call request directly to the recipient, before or during the call request, using a data transmission channel. The caller's terminal should make sure that the authenticate call request arrives at the recipient's terminal before or during the ring. Hence, the caller's mobile switching center would not need to be delegated to handle the generation and transmission of CST on behalf of the caller.

Figure 7:
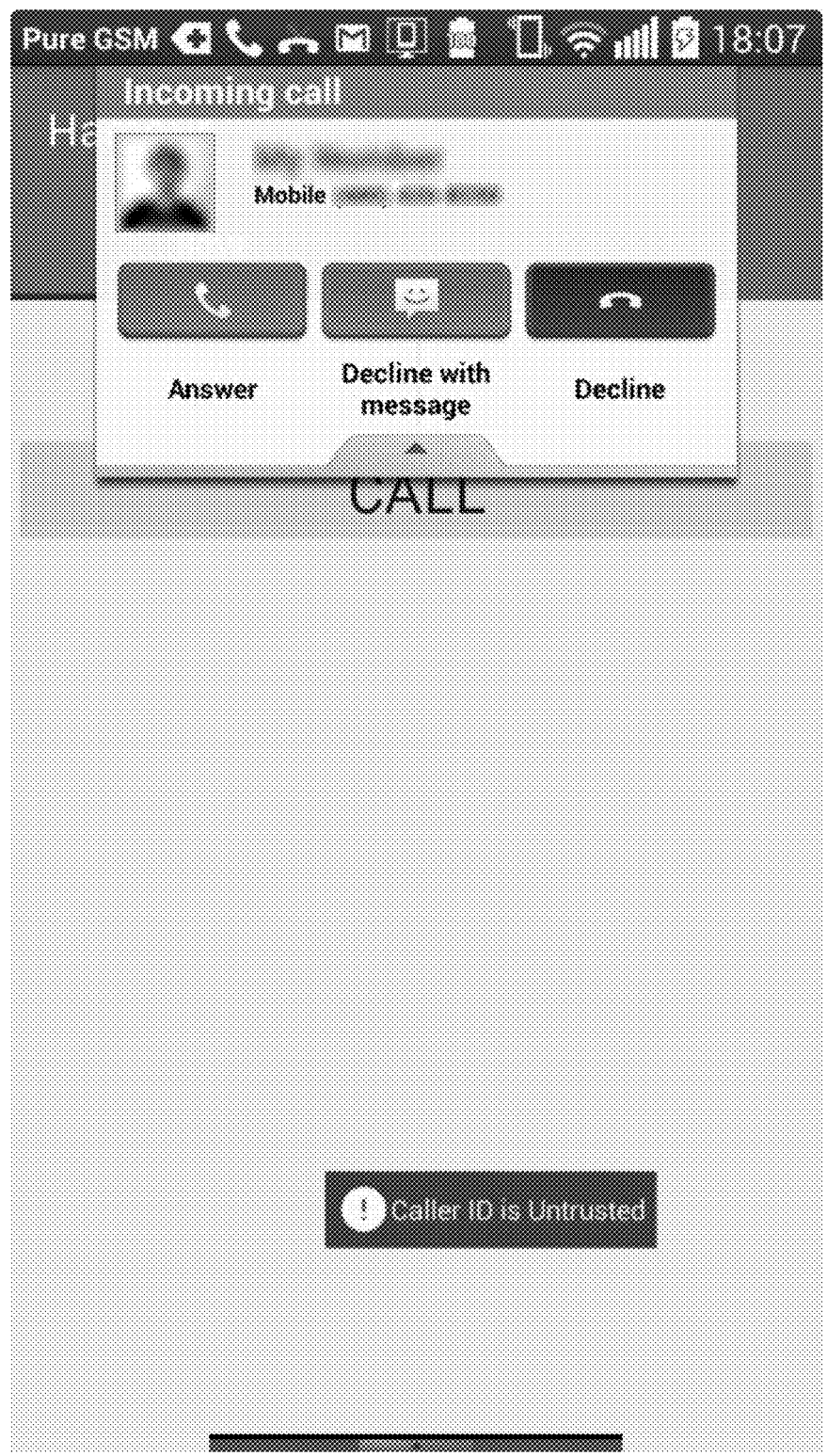
FIG. 7 is a screen shot of a recipient's phone receiving a call in the prototype implementation.

For the recipient, after receiving an authenticated call request message, the verification could be directly executed by the recipient's mobile terminal, which should happen before or during the ring. As a result, the recipient's mobile switching center would not need to be delegated to handle the verification of the CIC and CST on behalf of the recipient. FIG. 7 is a screen shot of a recipient's phone receiving a call in the prototype implementation.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A method for authenticated communication, the method comprising:
   receiving a key pair including a public key and a private key at a registrar, the key pair generated by a caller device, the caller device in communication with the registrar over a network;
   receiving a routing address from the caller device at a registrar;
   generating a nonce for the caller device using the registrar, the nonce encrypted with the public key;
   sending the nonce encrypted with the public key to the routing address;
   receiving the nonce at the registrar from the caller device, the nonce decrypted by the caller device using the public key; and
   generating an identity certificate for the caller device using the registrar, the identity certificate including the routing address and the public key each signed by the registrar.

2. The method of claim 1, further comprising:
   sending the identity certificate to the caller device for generating an authenticated communication request header.

3. The method of claim of claim 2, wherein the communication request header is used by the caller device to initiate a communication with a recipient device, the communication being at least one of a call, a short message service (SMS) message, or a multimedia messaging service (MMS) message.

4. The method of claim 1, wherein the nonce is a randomly generated.

5. The method of claim 1, wherein the registrar generates a signature for the nonce prior to sending the nonce encrypted with the public key to the routing address.

6. The method of claim 5, wherein the caller device verifies an authenticity of the nonce using the signature prior to decrypting the nonce.

7. The method of claim 1, wherein the identity certificate further includes an expiration time.

8. The method of claim 1, further comprising:
   revoking any previous identity signatures associated with the routing address.

9. The method of claim 1, wherein the identity certificate further includes identity information associated with the caller device.

10. A method for authenticated communication, the method comprising:
    receiving a communication session token at a recipient device from a caller device over a network in connection with a request for communication, the communication session token generated by the caller device using a timestamp and a recipient routing address each signed with a private key for the caller device;
    obtaining an identity certificate for the caller device at the recipient device, the identity certificate including a caller routing address and a public key corresponding to the private key for the caller device, the caller routing address and the public key each authenticated by a registrar;
    determining a validity of the communication session token by verifying the timestamp is within a valid duration and by matching the recipient routing address to a known routing address for the recipient device; and
    generating an authentication of the request for communication based on the validity of the communication session token and the identity certificate.

11. The method of claim 10, wherein the communication session token and the identity certificate are received at the recipient device as a set of fields in a communication request header with the request for communication.

12. The method of claim 11, wherein the set of fields are included as an extension to the communication request header.

13. The method of claim 10, wherein the identity certificate is obtained by the recipient device from at least one of a public database, the registrar, or a previous communication with the caller device.

14. The method of claim 10, further comprising:
    displaying the authentication of the request for communication with a delivery of the request for communication to the recipient device.

15. The method of claim 10, wherein the caller device is a calling terminal or an origination switch and the recipient device is a receiving terminal or a termination switch.

16. A system for authenticated communication, the system comprising:
    a caller device having a caller routing address and a key pair, the key pair including a public key and a private key;
    a registrar in communication with the caller device, the registrar generating an identity certificate for the caller device following a verification of the caller routing address and the key pair, the identity certificate including a signed routing address and a signed public key for the caller device; and
    a recipient device authenticating a request for communication received from the caller device over a network, the recipient device authenticating the request for communication using the identity certificate.

17. The system of claim 16, wherein the request for communication includes a communication session token signed by the caller device using the private key.

18. The system of claim 17, wherein the communication session token includes a timestamp for the request for communication and a recipient routing address.

19. The system of claim 18, wherein the recipient device further authenticates the request for communication by verifying the timestamp is within a valid duration and by matching the recipient routing address to a known routing address for the recipient device.

20. The system of claim 16, wherein the caller device is a calling terminal or an origination switch and the recipient device is a receiving terminal or a termination switch.

* * * * *